(12) United States Patent
Hatcher et al.

(10) Patent No.: US 12,453,406 B2
(45) Date of Patent: Oct. 28, 2025

(54) MAGNETIC COUPLER FOR AN ARTICLE OF WEAR

(71) Applicant: Axon Enterprise, Inc., Scottsdale, AZ (US)

(72) Inventors: Jonathan Hatcher, Daytona Beach, FL (US); Mark Eastwood, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 224 days.

(21) Appl. No.: 18/141,793

(22) Filed: May 1, 2023

(65) Prior Publication Data

US 2024/0365961 A1    Nov. 7, 2024

Related U.S. Application Data

(63) Continuation of application No. PCT/US2021/057427, filed on Oct. 29, 2021.
(Continued)

(51) Int. Cl.
*A45F 5/02* (2006.01)
*F16B 2/20* (2006.01)
*A45F 5/00* (2006.01)

(52) U.S. Cl.
CPC ............. *A45F 5/02* (2013.01); *F16B 2/20* (2013.01); *A45F 2005/023* (2013.01); *A45F 5/1533* (2025.01); *F16B 2200/83* (2023.08)

(58) Field of Classification Search
CPC ........ A45F 5/02; A45F 5/1516; A45F 5/1508; A45F 5/1533; A45F 5/1525; F16M 13/04; G03B 17/561
See application file for complete search history.

(56) References Cited

U.S. PATENT DOCUMENTS 5,682,653 A * 11/1997 Berglof .................... G09F 1/10
                                                             224/183
7,721,392 B2 * 5/2010 Avery ...................... A45F 5/02
                                                             24/3.12
(Continued)

FOREIGN PATENT DOCUMENTS

KR        20-0304455 Y1    2/2003

OTHER PUBLICATIONS

Korean Intellectual Property Office, International Search Report for International Application No. PCT/US2021/057427 mailed Feb. 24, 2022.

*Primary Examiner* — Adam J Waggenspack
(74) *Attorney, Agent, or Firm* — Andrew Terajewicz

(57) ABSTRACT

A coupler for coupling an accessory to a provided article of wear comprises a front plate and a back plate. The front plate and the back plate may each comprise a magnetic material. The front plate may include a mount interface configured to receive the accessory and a slot configured to receive a portion of the article of wear. The slot may be configured to suspend the front plate relative to the article of wear via the portion of the article of wear. Engagement of the slot with the portion of the article of wear may align the front plate to the article of wear. The back plate may be configured to couple with the front plate over the article of wear via attraction between the magnetic materials. Engagement of the magnetic materials may provide a retention force to secure the front plate to the article of wear.

20 Claims, 2 Drawing Sheets

Related U.S. Application Data

(60) Provisional application No. 63/107,946, filed on Oct. 30, 2020.

(56) References Cited

U.S. PATENT DOCUMENTS

| | | | |
|---|---|---|---|
| 10,480,711 B1* | 11/2019 | Tran | A45F 5/02 |
| 11,812,242 B1* | 11/2023 | Curran | H04R 1/025 |
| 2008/0023508 A1 | 1/2008 | Harchol | |
| 2011/0079619 A1 | 4/2011 | Lewis | |
| 2015/0103246 A1 | 4/2015 | Phillips et al. | |

* cited by examiner

MAGNETIC COUPLER FOR AN ARTICLE OF WEAR

FIELD OF INVENTION

Embodiments of the present invention relate to couplers that enable mounting of an accessory relative to an article of wear.

BACKGROUND

Public safety personnel, such as police officers and firefighters, use cameras to capture events, so that a video and/or audio record exists of what happened in an incident. These cameras may be mounted on vehicles such as cars and drones, and they may be worn on the body as body worn cameras. Numerous mounting systems exist to mount cameras to personnel.

It is often useful or necessary to secure an item onto a sheet of material, such as a fabric or item of clothing. As one example, it can be useful or necessary for a law enforcement officer to secure a body camera to the officer's uniform shirt. Such a connection is preferably made without damaging or altering the shirt.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION

Figure 1:
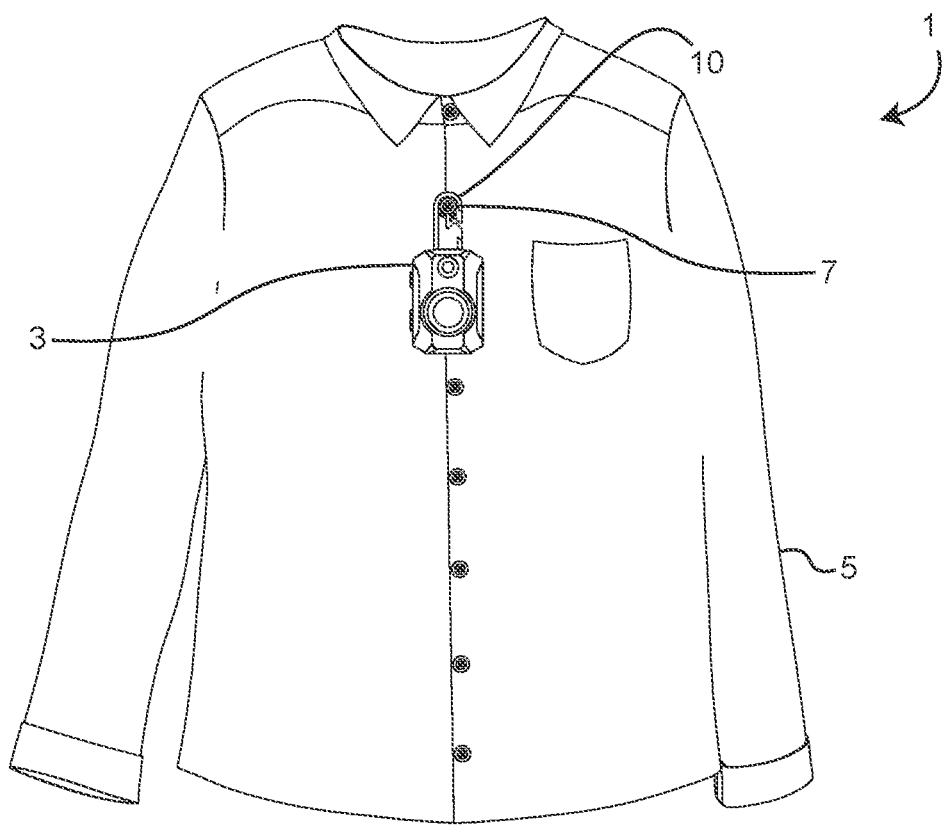
FIG. 1 is a front view showing an implementation of a coupler system, according to one or more aspects described herein.

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

A coupler (e.g., mount, clothing mount, etc.) according to various aspects of the present disclosure, may include a first part (e.g., back plate, etc.) and a second part (e.g., front plate, etc.). Each part may include physically separate, but engageable structures and portions. The engageable structures and portions may be configured to engage one another to couple the back plate with the front plate. The front plate may releasably engage one or more portions of an article of wear, thereby coupling the front plate to the article of wear. The front plate may releasably engage the back plate over an article of wear, thereby coupling the front plate and the back plate to the article of wear.

One or more components of a coupler may comprise one or more rigid, plastic materials, metal materials, and/or composite materials. A rigid material may include materials resistant to deformation under typical usage loads. The one or more rigid materials may include corrosion-resistant materials, UV resistant materials, and/or materials configured to withstand environmental factors. Rigid materials may include metals and metallic alloys (e.g., aluminum, steel, titanium, etc.), composites (e.g., fiberglass, carbon fiber, etc.), and plastics (e.g., polycarbonate/acrylonitrile butadiene styrene, polyether ether ketone, Nylon 6/6, etc.). The rigid materials may also be treated (e.g., heat-treated, galvanized, anodized) and/or painted (e.g., powder-coated, e-coated, etc.).

An article of wear may include articles configured to be worn by a person or an animal. For example, an article of wear may include a garment, shirt, jacket, hat, vest, uniform, pants, gloves, shoes, or any other article configured to be worn. Articles of wear may also include soft goods that are not worn on a person, such as fabric of a tent, parachute cloth, and other similar soft goods. An article of wear may comprise a range of thicknesses, such as between 0.005 in to 1 in (0.127 mm to 25.4 mm). An article of wear may comprise various materials, such as stiff materials, flexible materials, elastic materials, synthetic materials, natural materials, and combinations thereof.

In various embodiments, a front plate may be configured to couple with a provided accessory. For example, a front plate may include a mount interface (e.g., a connector, a receiver, a coupler, etc.) configured to releasably couple to an accessory (e.g., accessory device, etc.). An accessory may include a portable recording device (e.g., microphone, body worn camera, etc.), a radio, a flashlight, an ammunition magazine, or any other item desired to be mounted to an article of wear. A front plate may be positioned on a first side of the article of wear and engage a back plate positioned on a second side of the article of wear. An article of wear may be disposed between the front plate and the back plate. Engagement of the back plate with the front plate over the article of wear may couple the front plate to the article of wear. Thus, an accessory may be coupled to an article of wear via the front plate without a need to alter (e.g., cut, sew, modify, etc.) the article of wear.

In various embodiments, a front plate may be configured to couple to an article of wear independently of a back plate. A front plate may releasably couple with one or more portions of an article of wear independently of a back plate. Each portion of the one or more portions of the article of wear may extend (e.g., protrude, project, stick out, etc.) from the article of wear. A portion of an article of wear may include a fastener, button, grommet, zipper, eye, clasp, buckle, pocket, collar, sleeve, threads, and combinations thereof. For example, a front plate may be configured to releasably couple with a button of an article of wear and/or threads fastening the button to the article of wear. Engagement of the front plate with the portion of the article of wear may couple the front plate to the article of wear. A front plate may be configured to hang from the portion of the article of wear. Coupling of the front plate with the portion of the article of wear may suspend (e.g., retain, etc.) the front plate relative to the article of wear. Coupling of the front plate with the portion of the article of wear may align the front plate to the article of wear, thereby enabling the back plate to more conveniently be positioned to the front plate over the article of wear.

In various embodiments, a front plate may be configured to releasably couple with a back plate over a provided article of wear. A back plate may be configured to releasably couple with a front plate over an article of wear. A front plate may magnetically attach to a back plate. A back plate may magnetically attach to a front plate. A front plate may comprise one or more magnetic materials that are configured to engage one or more magnetic materials of a back plate to releasably secure the front plate relative to the back plate. A back plate may comprise one or more magnetic materials that are configured to engage one or more magnetic materials of a front plate to releasably secure the back plate relative to the front plate. One of a first magnetic material of the back plate and a second magnetic material of the front plate may be configured to attract the other of the first magnetic material of the back plate and the second magnetic material of the front plate. Magnetic materials may include temporary magnets, permanent magnets, electromagnets, ferrous materials, ferromagnetic materials, ferrimagnetic materials, and any other material configured to magnetically attract another material.

Figure 2:
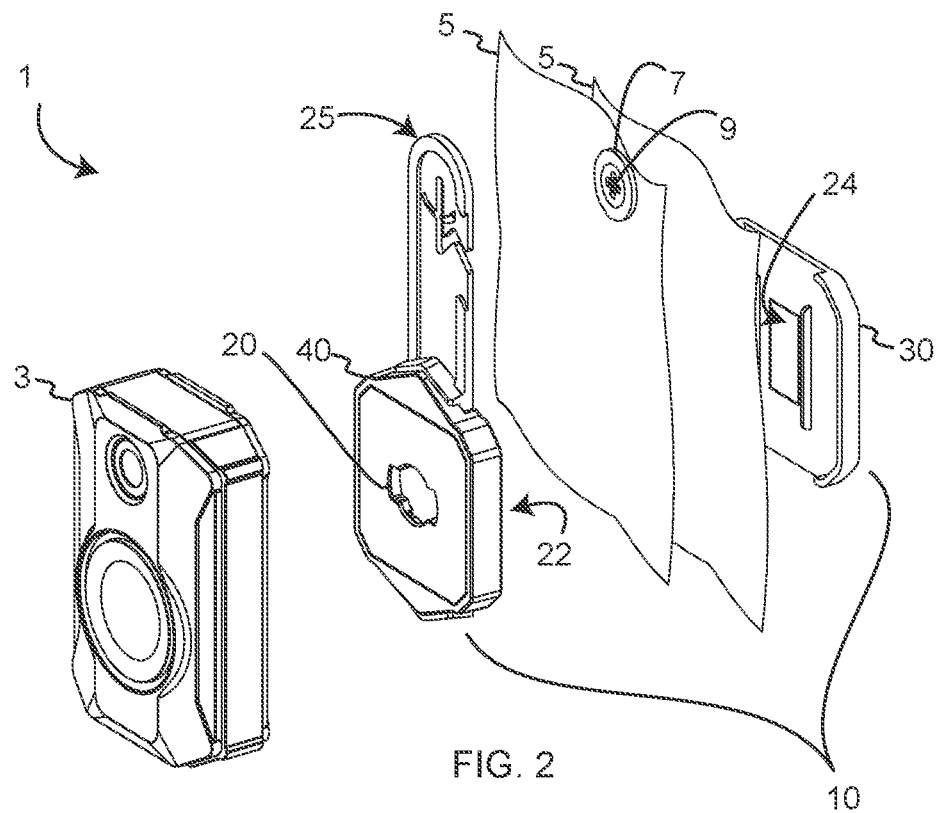
FIG. 2 is an exploded view showing an implementation the coupler system of FIG. 1, according to one or more aspects described herein.

In various embodiments, and with reference to FIGS. 1 and 2, a coupler system, such as system 1 for coupling an accessory to an article of wear is disclosed. It should be understood by one skilled in the art that FIG. 1 is an example illustration of system 1. In the example of FIG. 1, system 1 may comprise a coupler 10 and an accessory, such as camera 3. Coupler 10 may be configured to releasably (e.g., removably, etc.) couple (e.g., attach, etc.) to an article of wear, such as article of wear 5. Camera 3 may be configured to releasably attach to coupler 10.

In various embodiments, coupler 10 may comprise two physically separate, but engageable parts. For example, coupler 10 may include a back plate, such as back plate 30 (e.g., first part, first plate, inside plate, retaining plate, etc.) and a front plate, such as front plate 40 (e.g., second part, second plate, outside plate, base plate, etc.). Each of back plate 30 and front plate 40 may comprise one or more rigid materials as disclosed previously herein.

In various embodiments, a geometry of coupler 10 may enable back plate 30 to releasably engage front plate 40 over a range of thin and deformable materials, such as a provided article of wear 5. Front plate 40 may be configured to engage back plate 30 over article of wear 5, thereby providing a base to which a provided accessory, such as camera 3, may attach. Article of wear 5 may comprise a variety of articles ranging in thickness and composition. For example, a thickness of article of wear 5 may include a range of thicknesses, such as between 0.005 in to 0.150 in (0.127 mm to 3.810 mm). Article of wear 5 may comprise a variety of materials, such as textiles, foams, elastomers, and the like. Article of wear 5 may comprise multiple sheets of material. Article of wear 5 may comprise a planar shape. Article of wear 5 may comprise a planar shape proximate a portion of article wear 5 configured to be received by front plate 20. Article of wear 5 may include articles of wear as previously discussed herein.

In various embodiments, front plate 40 may comprise a first magnetic material, such as first magnetic material 22. First magnetic material 22 may be configured to engage a second magnetic material of back plate 30, such as second magnetic material 24. At least one of first magnetic material 22 and second magnetic material 24 may comprise a permanent (e.g., hard) magnet, only one of first magnetic material 22 and second magnetic material 24 may comprise a permanent magnet, or both of first magnetic material 22 and second magnetic material 24 may comprise a respective permanent magnet. The permanent magnet may comprise rare earth magnets and non-rare earth magnets. Rare earth magnets may include neodymium (e.g., neodymium iron boron) magnets, samarium (e.g., samarian cobalt) magnets, and the like. Non-rare earth magnets may comprise aluminum nickel cobalt (e.g., alnico) magnets, ceramic magnets, ferrite magnets, and the like. One of first magnetic material 22 and second magnetic material 24 may comprise a temporary (e.g., soft) magnet. Temporary magnets may comprise steel, iron alloys, and other ferromagnetic materials or ferrimagnetic materials that only retain their magnetism when in proximity to permanent magnetic materials.

In embodiments, a magnetic material may comprise a discrete portion of a plate. The discrete portion may comprise a magnetic element. For example, a first magnetic element of front plate 40 may comprise first magnetic material 22. Alternately or additionally, a second magnetic element of back plate 30 may comprise second magnetic material 24. The plate may further comprise one or more non-magnetic portions in addition to the discrete portion. Accordingly, different discrete portions of the plate may be magnetic and non-magnetic in accordance with whether each portion of the different portion comprises a magnetic material or a non-magnetic material.

In various embodiments, front plate 40 may be disposed adjacent a first surface or first side of article of wear 5. The first surface may be an outer surface of article of wear 5 (e.g., a surface facing away from the wearer). Back plate 30 may be disposed adjacent a second surface or second side of article of wear 5 that is opposite the first surface. The second surface may be an inner surface of article of wear 5 (e.g., a surface facing toward the wearer). Back plate 30 may be configured to couple to front plate 40 over article of wear 5 without damaging article of wear 5 via first magnetic material 22 and second magnetic material 24. Article of wear 5 may conform to a shape of front plate 40 and back plate 30. Engagement first magnetic material 22 with second magnetic material 24 may produce a normal retention force between front plate 40 and back plate 30. The normal retention force may be in a direction perpendicular to a surface of article of wear 5. The normal retention force may be in a direction (e.g., first direction) toward front plate 40 from back plate 30, toward back plate 30 from front plate 40, or between front plate 40 and back plate 30.

In various embodiments, camera 3 may couple with coupler 10 via a mount interface of front plate 40, such as mount interface 20. Camera 3 may be removably coupled to coupler 10 via mount interface 20 while coupler 10 remains coupled to article of wear 5. Camera 3 may be removed from coupler 10, without decoupling coupler 10 from article of wear 5.

In various embodiments, front plate 40 may couple with article of wear 5. Front plate 40 may couple with article of wear 5 separately from (e.g., independently of, etc.) back plate 30. Front plate 40 may couple with a portion of article of wear 5, such as a button, threads that couple a button to article of wear 5, or combinations thereof. Front plate 40 may comprise one or more structures, such as a hook 25, configured to engage article of wear 5 to couple front plate 40 to article of wear 5. Hook 25 may be configured to abut a portion of an article of wear, such as button 7. Hook 25 may be configured to encircle a portion of an article of wear, such as threads 9. Hook 25 may suspend front plate 40 to article of wear 5. Front plate 40 may hang via hook 25 on threads 9. Hook 25 may maintain front plate 40 at a relative position to article of wear 5 to which hook 25 is coupled. When front plate 40 is engaged with threads 9, button 7 may be adjacent a first surface of front plate 40, and article of wear 5 may be adjacent a second surface of front plate 40, opposite the first surface. Front plate 40 may be coupled with button 7 and/or threads 9 prior to back plate 30 coupling with front plate 40 over article of wear 5. In this manner, front plate 40 may be positioned relative to article of wear 5 so a user may more easily locate back plate 30 to front plate 40 over article of wear 5. Engagement of hook 25 with threads 9 of article of wear 5 may constrain movement of front plate 40 about threads 9 of article of wear 5.

In various embodiments, coupling of hook 25 with article of wear 5 may be configured to provide a retention force to secure front plate 40 to article of wear 5. For example, coupling of hook 25 may provide a normal retention (e.g., pull) force between front plate 40 and article of wear 5, a sheer retention force between front plate 40 and article of wear 5, or both a normal retention force and a sheer retention force between front plate and article of wear 5. The normal retention force may be oriented in a same direction as the force provided by engagement of first magnetic material 22 with second magnetic material 24. The sheer retention force may be oriented in a direction perpendicular to the normal retention force. The sheer retention force may be oriented in a direction opposite a direction of a force of gravity. The sheer retention force may be oriented along a surface of article of wear 5. The sheer retention force may be oriented in a direction perpendicular to a first direction from which the portion of article of wear 5 extends from article of wear 5 and is received through hook 25.

Figure 3:
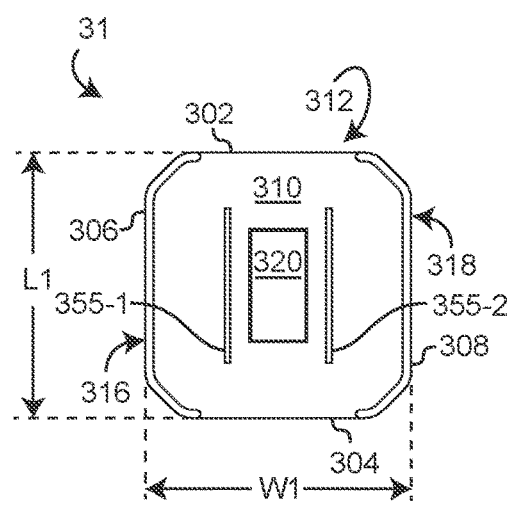
FIG. 3 is a front view showing an implementation of a back plate, according to one or more aspects described herein.

FIG. 3 shows a front view of a back plate 31, which may be similar to, or share similar aspect or components with the back plates discussed previously herein (e.g., back plate 30, etc.). It should be understood by one skilled in the art that FIG. 3 is an example illustration of back plate 31, and one or more components of back plate 31 may be located in any suitable position within, or external to, back plate 31. Back plate 31 may be a unitary part formed using any number of methods, such as casting, forging, molding, stamping, forming, and machining. For example, back plate 31 may comprise a stamped or cut sheet of metal. Back plate 31 may be formed of multiple components that are assembled together (e.g., two components, three components, four components, and so on).

In various embodiments, back plate 31 may comprise a rectangular shape. Back plate 31 may extend from a first end (e.g., first back plate end, etc.) 302 to a second end (e.g., second back plate end, etc.) 304 between a third end (e.g., third back plate end, etc.) 306 and a fourth end (e.g., fourth back plate end, etc.) 308. First end 302 may be opposite second end 304. Third end 306 may be opposite fourth end 308. A first plane of symmetry may bisect each of first end 302 and second end 304. A second plane of symmetry may bisect each of third end 306 and fourth end 308.

In various embodiments, a length of back plate 31, such as length (e.g., first back plate length, first length, etc.) L1, may comprise a longest dimension between first end 302 and second end 304. For example, a length of back plate 31 may be between 1 inch and 1.5 inches (2.54 centimeters and 3.81 centimeters, between 1.5 inches and 2 inches (3.81 centimeters and 5.08 centimeters), between 2 inches and 3 inches (5.08 centimeters and 7.62 centimeters), between 1 inch and 3 inches (2.54 centimeters and 7.62 centimeters), or any other suitable length.

In various embodiments, a width of back plate 31, such as width (e.g., first back plate width, first width, etc.) W1, may comprise a widest dimension between third end 306 and fourth end 308. For example, a width of back plate 31 may be between 1 inch and 1.5 inches (2.54 centimeters and 3.81 centimeters, between 1.5 inches and 2 inches (3.81 centimeters and 5.08 centimeters), between 2 inches and 3 inches (5.08 centimeters and 7.62 centimeters), between 1 inch and 3 inches (2.54 centimeters and 7.62 centimeters), or any other suitable width. Width W1 may be equal to, less than, or greater than length L1.

In various embodiments, back plate 31 may comprise a first surface (e.g., first back plate surface, etc.) 310 that is opposite a second surface (e.g., second back plate surface, etc.) 312. First surface 310 and second surface 312 may each comprise a smooth surface. In some embodiments, first surface 310 and/or second surface 312 may each comprise a textured surface to improve grip between back plate 31 and article of wear 5.

In various embodiments, a thickness of back plate 31 between first surface 310 and second surface 312 may be between 0.040 inches and 0.060 inches (0.10 centimeters and 0.15 centimeters), between 0.060 inches and 0.10 inches (0.15 centimeters and 0.25 centimeters), between 0.10 inches and 0.25 inches (0.25 centimeters and 0.64 centimeters), between 0.040 inches and 0.25 inches (0.10 centimeters and 0.64 centimeters), or any other suitable thickness. The thickness of back plate 31 may be minimized to increase the ergonomics of back plate 31. The thickness of back plate 31 may be minimized to reduce an interference between back plate 31 and a user.

In various embodiments, back plate 31 may comprise one or more magnetic materials, such as first magnetic material 320. First magnetic material 320 may be similar to, or share similar aspects with, the magnetic materials discussed previously herein (e.g., first magnetic material 22, second magnetic material 24, etc.). First magnetic material 320 may be assembled to back plate 31. For example, first magnetic material 320 may be permanently attached (e.g., via adhesive) to a portion of back plate 31. First magnetic material 320 may comprise a bar magnet (e.g., neodymium bar magnet, etc.) that is attached to or flush with first surface 310. First magnetic material 320 may comprise a magnetic portion disposed adjacent one or more non-magnetic portions of back plate 31. First magnetic material 320 may comprise a north pole and a south pole. The north pole and the south pole may each be oriented in a direction parallel to first surface 310 and second surface 312. The north pole and the south pole may each be oriented parallel to a slot of a front plate (e.g., slot 440 of front plate 41 with brief reference to FIG. 4). First magnetic material 320 may be magnetized through a thickness of first magnetic material 320. The thickness of first magnetic material 320 may comprise the smallest dimension of first magnetic material 320.

In various embodiments, back plate 31 may be formed of a magnetic material. For example, back plate 31 may comprise a stamped sheet or cut sheet of magnetic material. In such embodiments, each element (e.g., track, lip, planar surface portion, etc.) may comprise the magnetic material. A cost of cutting and/or stamping a back plate 31 from a magnetic material may be less than a cost of sourcing and assembling a magnetic material, such as first magnetic material 320, to back plate 31. Back plate 31 may lack a non-magnetic portion in such embodiments, thereby enabling an attraction force to be provided between back plate 31 and a front plate when back plate 31 and the front plate are disposed in various relative orientations and positions.

In various embodiments, a back plate may comprise one or more lips each extending along at least a portion of a perimeter of the back plate. A lip may comprise an edge that is raised above a surface. When a back plate is engaged with a front plate, a lip of a back plate may be configured to encircle a portion of the front plate, such as at least a portion of a periphery of the front plate. A lip may be configured to aid in aligning a back plate to a front plate over an article of wear. A lip may be configured to cooperate with a front plate to locate a back plate to the front plate. A lip may be configured to aid in securing a back plate to a front plate over an article of wear by causing the article of wear to fold around the lip. A lip may be configured to increase a sheer retention force between a front plate and a back plate. A lip may be configured to prevent the front plate from translating relative to a back plate.

In various embodiments, back plate 31 may comprise one or more lips, such as first lip 316 and second lip 318. First lip 316 and second lip 318 may each extend along a portion of a perimeter of back plate 31. First lip 316 and second lip 318 may each protrude above first surface 310. First lip 316 may extend along at least a portion of third end 306. Second lip 318 may extend along at least a portion of forth end 308. First lip 316 may extend along all of third end 306. Second lip 318 may extend along all of fourth end 308. First lip 316 may extend along a portion of first end 302. Second lip 318 may extend along a portion of first end 302. First lip 316 may extend along a portion of a second end 304. Second lip 318 may extend along a portion of second end 304. First lip 316 and second lip 318 may be contiguous (e.g., unitary, etc.).

In various embodiments, a back plate may comprise at least one of a track and a channel. A track may comprise a protrusion that is raised above a surface. A channel may comprise a cavity (e.g., void, recess, etc.) that is recessed below a surface. A track may comprise a protrusion that longitudinally extends about a line. The line may be a straight line. A channel may comprise a recess that longitudinally extends about a line. The line may be a straight line. A track may be configured to engage a respective channel. A channel may be configured to engage a respective track. A track may be configured to sit within a channel. A channel may be configured to receive a track. A track and a channel may be configured to aid in aligning a back plate to a front plate over an article of wear. A track may cooperate with a channel to locate a front plate to a back plate. A track may cooperate with a channel to aid in securing a back plate to a front plate over an article of wear by causing the article of wear to fold around the track and the channel. A track may cooperate with a channel to partially dispose the article of wear within the channel. The article of wear may be compressed between the track and the channel. Engaging a back plate with a front plate may cause both an article of wear and a track to be received in a channel. Cooperation between a track and a channel may be configured to increase a sheer retention force between a front plate and a back plate. Engagement of a track with a respective channel may prevent a front plate from translating relative to a back plate. A track may engage a channel in a first direction toward a front plate from back plate or vise versa. Engagement of a track and channel may prevent movement of the front plate relative to the back plate in a second direction perpendicular to the first direction.

In various embodiments, back plate 31 may comprise one or more tracks. For example, back plate 31 may comprise a first track, such as first track 355-1, and a second track, such as second track 355-2. First track 355-1 and second track 355-2 may each protrude above first surface 310. First track 355-1 and second track 355-2 may each protrude from first surface 310. First track 355-1 and second track 355-2 may each extend along straight lines. First track 355-1 and second track 355-2 may be parallel with one another. First magnetic material 320 may be located between first track 355-1 and second track 355-2.

Figure 4A:
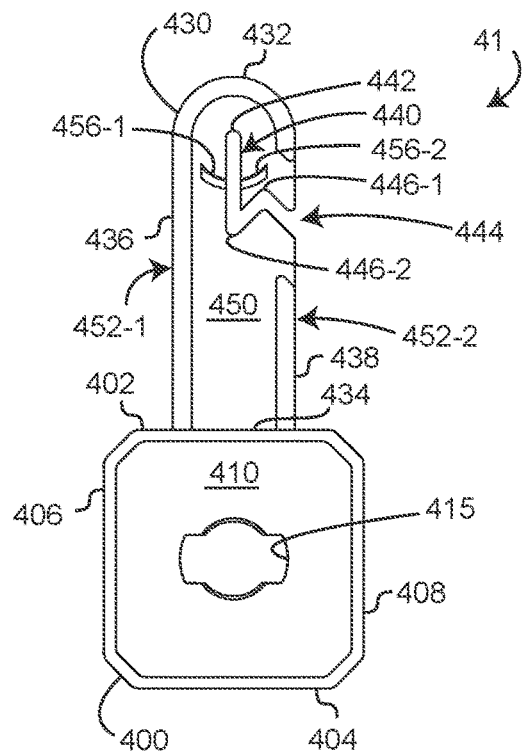
FIG. 4A is a front view showing an implementation of a front plate, according to one or more aspects described herein.
Figure 4B:
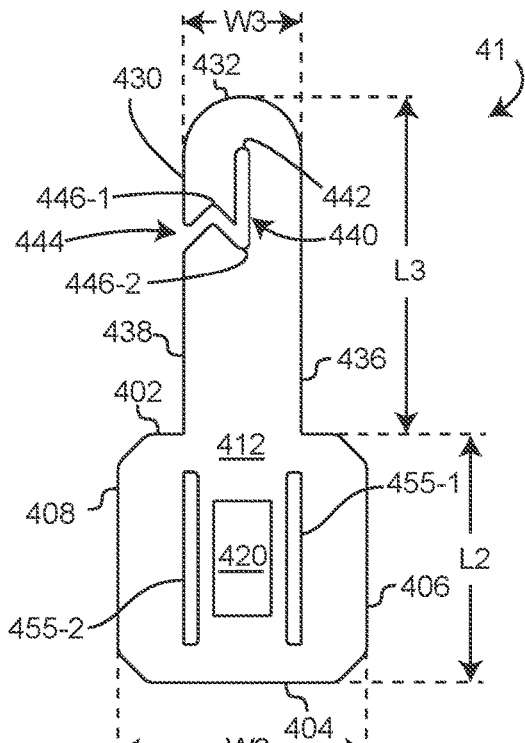
FIG. 4B is a back view showing an implementation of the front plate of FIG. 4A, according to one or more aspects described herein.

FIGS. 4A and 4B show a front view of a front plate 41 and a back view of front plate 41 respectively. Front plate 41 may be similar to, or share similar aspect or components with the front plates discussed previously herein (e.g., front plate 40, etc.). It should be understood by one skilled in the art that FIGS. 4A-4B are example illustrations of front plate 41, and one or more components of front plate 41 may be located in any suitable position within, or external to, front plate 41. Front plate 41 may be a unitary part formed using any number of methods, such as casting, forging, molding, stamping, forming, and machining. For example, front plate 41 may comprise a single stamped sheet or cut sheet of material. Front plate 41 may be formed of multiple components that are assembled together (e.g., two components, three components, four components, etc.). Front plate 41 may comprise a center portion, such as center portion 400, configured to receive an accessory (e.g., camera 3, etc.) and a hook (e.g., tab, etc.), such as hook 430, configured to releasably couple with a portion of an article of wear (e.g., button 7, threads 9, etc., with brief reference to FIGS. 1-2).

In various embodiments, center portion 400 may comprise a rigid material as discussed previously herein. Center portion 400 may extend from a first end (e.g., first center portion end, etc.) 402 to a second end (e.g., second center portion end, etc.) 404 between a third end (e.g., third center portion end, etc.) 406 and a fourth end (e.g., fourth center portion end, etc.) 408. First end 402 may be opposite second end 404. Third end 406 may be opposite fourth end 408. A first plane of symmetry may bisect each of first end 402 and second end 404. A second plane of symmetry may bisect each of third end 406 and fourth end 408.

In various embodiments, a length of center portion 400, such as second length (e.g., center portion length, first front plate length, etc.) L2, may comprise a longest dimension between first end 402 and second end 404. For example, a length of center portion 400 may be between 1 inch and 1.5 inches (2.54 centimeters and 3.81 centimeters, between 1.5 inches and 2 inches (3.81 centimeters and 5.08 centimeters), between 2 inches and 3 inches (5.08 centimeters and 7.62 centimeters), between 1 inch and 3 inches (2.54 centimeters and 7.62 centimeters), or any other suitable length.

In various embodiments, a width of center portion 400, such as second width (e.g., center portion width, first front plate width, etc.) W2, may comprise a widest dimension between third end 406 and fourth end 408. For example, a width of center portion 400 may be between 1 inch and 1.5 inches (2.54 centimeters and 3.81 centimeters, between 1.5 inches and 2 inches (3.81 centimeters and 5.08 centimeters), between 2 inches and 3 inches (5.08 centimeters and 7.62 centimeters), between 1 inch and 3 inches (2.54 centimeters and 7.62 centimeters), or any other suitable width.

In various embodiments, second length L2 may be equal to, greater than, or less than second width W2. Second length L2 and second width W2 may be dimensioned to cooperate with a back plate (e.g., back plate 30, back plate 31, etc.). For example, second length L2 may be slightly less than a length of a back plate (e.g., length L1, etc.) to enable one or more lips of a back plate (e.g., first lip 316, second lip 318, etc.) to encircle at least a portion of a periphery of center portion 400. Second width W2 may be slightly less than a width of a back plate (e.g., width W1, etc.) to enable one or more lips of a back plate (e.g., first lip 316, second lip 318, etc.) to encircle a periphery of center portion 400. Center portion 400 may comprise a similar size and/or shape with back plate 31.

In various embodiments, center portion 400 may comprise an outer surface (e.g., first center portion surface, first front plate surface, etc.) 410 that is opposite an inner surface (e.g., second center portion surface, second front plate surface, etc.) 412. Outer surface 410 and inner surface 412 may each comprise a smooth surface. In some embodiments, outer surface 410 and/or inner surface 412 may each comprise a textured surface to improve grip between front plate 41 and article of wear 5.

In various embodiments, a thickness of center portion 400 between outer surface 410 and inner surface 412 may be between 0.1 inches and 0.2 inches (0.25 centimeters and 0.51 centimeters), between 0.2 inches and 0.3 inches (0.51 centimeters and 0.76 centimeters), between 0.3 inches and 0.4 inches (0.76 centimeters and 1.01 centimeters), between 0.1 inches and 0.4 inches (0.25 centimeters and 1.01 centimeters), or any suitable thickness. The thickness of center portion 400 may be minimized to increase the ergonomics of front plate 41.

In various embodiments, front plate 41 may comprise one or more magnetic materials, such as second magnetic material 420. Second magnetic material 420 may be similar to, or share similar aspects with, the magnetic materials discussed previously herein (e.g., first magnetic material 22, second magnetic material 24, first magnetic material 320, etc.). Second magnetic material 420 may be assembled to front plate 41. For example, second magnetic material 420 may be permanently attached (e.g., via adhesive) to a portion of front plate 41. Second magnetic material 420 may comprise a bar magnet (e.g., neodymium bar magnet, etc.) that is attached to or flush with inner surface 412 of center portion 400. Second magnetic material 420 may comprise a north pole and a south pole. The north pole and the south pole may be oriented in a direction perpendicular to outer surface 410 and inner surface 412. Second magnetic material 420 may be magnetized through a thickness of second magnetic material 420. The north pole and the south pole may each be oriented parallel to slot 440 of front plate 41. The thickness of second magnetic material 420 may comprise a smallest dimension of second magnetic material 420. Second magnetic material 420 may be configured to attract first magnetic material 320 to produce a normal retention force between front plate 41 and back plate 31. Second magnetic material 420 may be positioned on front plate 41 such that second magnetic material 420 is aligned with first magnetic material 320 in a first direction normal to inner surface 412 upon coupling front plate 41 and back plate 31.

In various embodiments, front plate 41 may be formed of a magnetic material. For example, front plate 41 may comprise a stamped sheet or cut sheet of magnetic material. In such embodiments, each element (e.g., track, lip, planar surface portion, etc.) may comprise the magnetic material. A cost of cutting and/or stamping a front plate 41 from a magnetic material may be less than a cost of sourcing and assembling a magnetic material, such as second magnetic material 420, to front plate 41. Front plate 41 may lack a non-magnetic portion in such embodiments, thereby enabling an attraction force to be provided between front plate 41 and a back plate when front plate 41 and the back plate are disposed in various relative orientations and positions.

In various embodiments, a front plate may comprise at least one of a track and a channel as previously discussed herein. For example, a front plate may comprise one of a track and the channel, and a back plate may comprise the other of the track and the channel. In various embodiments, front plate 41 may comprise one or more channels. For example, front plate 41 may comprise a first channel, such as first channel 455-1, and a second channel, such as second channel 455-2. First channel 455-1 and second channel 455-2 may each protrude above outer surface 410. First channel 455-1 and second channel 455-2 may each extend along straight lines. First channel 455-1 and second channel 455-2 may be parallel with one another. First magnetic material 320 may be located between first channel 455-1 and second channel 455-2. First channel 455-1 and second channel 455-2 may be contiguous (e.g., unitary, etc.). First channel 455-1 and second channel 455-2 may be disposed on center portion 400 of front plate 41. First channel 455-1 and second channel 455-2 may be sized and/or shaped to each receive a corresponding track of a back plate (e.g., first track 355-1, second track 355-2, etc.)

In various embodiments, front plate 41 may comprise a mount interface configured to releasably receive an accessory device (e.g., camera 3). A mount interface may comprise a physical feature by which the accessory may be physically coupled with front plate 41 and by which the accessory may be physically removed from front plate 41. A mount interface may be configured to securely couple with an accessory, until the accessory is deliberately removed by a user. For example, front plate 41 may comprise a mount interface 415 that is configured to physically couple with an accessory (e.g., camera 3). Mount interface 415 may be similar to the mount interfaces previously described herein (e.g., mount interface 20, etc.). Mount interface 415 may be disposed on center portion 400. Mount interface 415 may be located at a center of center portion 400. Center portion 400 may provide a surface on which mount interface 415 is disposed. Mount interface 415 may comprise a mechanical interface. Mount interface 415 may include a physical feature by which the accessory may be physically coupled to front plate 41. For example, the physical feature may comprise one or more of a connector, a post, a receiver, a magnetic material, a suction cup, a smooth surface, or other mechanical interface configured to releasably couple with a complementary interface of camera 3. For example, mount interface 415 may comprise a female receiver configured to releasably couple with a mating male connector of an accessory. As a further example, mount interface 415 may comprise a magnetic material configured to couple with a corresponding magnetic material of camera 3. A person of ordinary skill in the art will appreciate that any mount interface may be substituted for mount interface 415, such as a male side of a bayonet mount, a female side of a bayonet mount, a cover and/or base as disclosed in U.S. Pat. No. 9,756,930 which is herein incorporated by reference in its entirety, etc.

In various embodiments, front plate 41 may comprise a feature configured to couple front plate 41 to an article of wear independent of a back plate. The feature may comprise a hook configured to hook (e.g., catch, latch, etc.) onto a portion of an article of wear. The hook may be incorporated into a center portion of a front plate, such as center portion 400. The hook may extend from a center portion of a front plate. A portion of the hook may partially, or completely, encircle a portion of an article of wear.

A hook may comprise a material selected to maintain a relative position between a first location of a portion of an article of wear to which the hook is coupled and a second location on the article of wear by which the central portion is coupled to the article of wear via a magnetic material. A hook may comprise a rigid material as described previously herein. A hook may comprise a flexible material. Hook 430 may comprise a flexible material, such as an elastomer, textile, or any other material configured to bend or compress under typical usage loads. For example, a hook may comprise a flexible lanyard configured to couple with a portion of an article of wear to prevent a front plate from decoupling from an article of wear A person of ordinary skill in the art will recognize that a hook may be disposed on either of the parts or each of the parts of a coupler as described herein. For example, a back plate may comprise a hook configured to secure the back plate to an article of wear independent of a front plate. As another example, a first part including a mount interface may exclude a hook, while a second part excluding a mount interface may include a hook.

In various embodiments, front plate 41 may comprise a hook, such as hook 430. Hook 430 may extend from an end of center portion 400, such as first end 402. Hook 430 may be configured to suspend center portion 400 from a portion of an article of wear (e.g., button 7, threads 9, etc.). The portion of the article of wear may be received through hook 430. Hook 430 may extend asymmetrically about a dimension (e.g., a width) of center portion 400. In this manner, front plate 41 may be positioned relative to an article of wear to conveniently allow back plate 31 to subsequently be coupled with front plate 41 over the article of wear via first magnetic material 320 and second magnetic material 420.

In various embodiments, hook 430 may extend from a first hook end (e.g., first end, etc.) 432 to a second hook end (e.g., second end, etc.) 434 between a third hook end (e.g., third end, etc.) 436 and a fourth hook end (e.g., fourth end, etc.) 438. First hook end 432 may be opposite second hook end 434. Second hook end 434 may be adjacent and/or contiguous with first end 402 of center portion 400. Third hook end 436 may be opposite fourth hook end 438. A first plane of symmetry may bisect each of first hook end 432 and second hook end 434. A second plane of symmetry may bisect each of third hook end 436 and fourth hook end 438.

In various embodiments, a length of hook 430, such as third length (e.g., hook length, second front plate length, etc.) L3, may comprise a longest dimension between first hook end 432 and second hook end 434. For example, a length of hook 430 may be between 1 inch and 1.5 inches (2.54 centimeters and 3.81 centimeters, between 1.5 inches and 2 inches (3.81 centimeters and 5.08 centimeters), between 2 inches and 3 inches (5.08 centimeters and 7.62 centimeters), between 1 inch and 3 inches (2.54 centimeters and 7.62 centimeters), or any other suitable length. Third length L3 may be parallel to second length L2 of center portion 400. Third length L3 may be greater than second length L2. In embodiments, an elongated length of hook 430, as defined by length L2, may increase an area over which a coupler comprising front plate 41 may engage an article of wear (e.g., article of wear 5), thereby increasing a stability of a coupler relative to the article of wear. This stability and corresponding increased rigidity between the coupler and the article of wear may provide particular benefit when an accessory device is further coupled to the front plate. The elongated length may also prevent interference between the accessory device and the portion of the article of wear (e.g., thread of a button, loop, etc.) to which the coupler is attached. The elongated length may also prevent interference between a center portion of the front plate and a portion of an article of wear that is encircled by the hook.

In various embodiments, a width of hook 430, such as third width (e.g., hook width, second front plate width, etc.) W3, may comprise a widest dimension between third hook end 436 and fourth hook end 438. For example, a width of hook 430 may be between 0.2 inches and 0.5 inches (0.51 centimeters and 1.27 centimeters), between 0.5 inches and 1 inch (1.27 centimeters and 2.54 centimeters), between 1 inch and 1.5 inches (2.54 centimeters and 3.81 centimeters, between 0.2 inches and 1.5 inches (0.51 centimeters and 3.81 centimeters), or any other suitable width. Third width W3 may be parallel to second width W2 of center portion 400.

In various embodiments, third width W3 may be less than or equal to second width W2. For example, a ratio of third width W3 to a width of front plate 41 (e.g., second width W2) may be less than or equal to 1:1, 1:2, 1:4, 1:6, or 1:10. Third length L3 may be less than, equal to, or greater than second length L3. For example, a ratio of third length L3 to second length L2 may be less than or equal to 2:1, 1:1, 1:2, 1:4, or 1:6.

In various embodiments, hook 430 may comprise an outer hook surface (e.g., outer surface, etc.) 450 that is opposite an inner hook surface (e.g., inner surface, etc.). Inner hook surface may be the same as inner surface 412 of center portion 400. For example, the inner hook surface may be flush and/or contiguous with inner surface 412. Outer hook surface 450 may be sub flush with outer surface 410. Outer hook surface 450 may comprise a smooth surface. In various embodiments, a thickness of hook 430 between outer hook surface 450 and inner hook surface may be less than a thickness of center portion 400 between outer surface 410 and inner surface 412.

In various embodiments, hook 430 may comprise a slot, such as slot 440. Slot 440 may be configured to couple front plate 41 to an article of wear in a direction (e.g., second direction). A surface of hook 430 by which slot 440 is defined may be configured to physically contact the article of wear in the direction upon the article of wear being received in slot 440.

In various embodiments, slot 440 may be disposed offset from center portion 400/mount interface 415. A portion of hook 430 (e.g., neck portion, intermediate portion, etc.) may be disposed between a first location at which slot 440 is positioned on hook 430 and a second location at which hook 430 is coupled to center portion 400. A length of the portion of hook 430 between slot 440 and center portion 400 may be greater than a length of slot 440 in a direction between slot 440 and center portion 400. Slot 440 may comprise an opening, such as opening (e.g., open end) 444.

In various embodiments, opening 444 may be sized and/or shaped to receive a portion of an article of wear. Slot 440 may extend between opening 444 and a closed end, such as closed end 442. Sliding hook 430 between a portion of an article of wear, such as button 7, and the article of wear, such as article of wear 5 to catch threads 9 in slot 440 may couple front plate 41 to the article of wear. Slot 440 may be configured to constrain movement of front plate 41 along an outer surface of an article of wear. Contact between closed end 442 of slot 440 and a portion of an article of wear may be configured to suspend front plate 41 relative to the article of wear. Opening 444 may be configured to receive a portion of an article of wear in a direction perpendicular to another direction in which mount interface 415 is configured to be coupled to a provided accessory.

A width of slot 440 may be constant between opening 444 and closed end 442. A width of slot 440 may reduce (e.g., taper, etc.) between opening 444 and closed end 442. A widest dimension of slot 440 may be less than a width of an end of a portion of an article of wear, such as a knot or a fastener, such as a button. The width of the end of the portion of an article of wear may be greater than a second width of another part (e.g., threads, neck, etc.) of the portion of the article of wear sized to be received within the width of slot 440. For example, a widest dimension (e.g., width) of slot 440 may be less than 0.5 inches, less than 0.25 inches, less than 0.125 inches, less than 0.060 inches, or any other suitable width configured to retain hook 430 to an article of wear. Closed end 442 may be proximal to first hook end 432 and opening 444 may be distal to first hook end 432. Closed end 442 may be distal to second hook end 434 and opening 444 may be proximal to second hook end 434. Closed end 442 may be proximal to mount interface 415 and opening 444 may be distal to mount interface 415. Opening 444 may be disposed a first distance from center portion 400/mount interface 415, closed end 442 may be disposed a second distance from center portion 400/mount interface 415, and the first distance may be less than the second distance. In such an orientation, a force of gravity may cause hook 430 to hang on an article of wear via closed end 442 of slot 440, thereby suspending front plate 41 relative to the article of wear.

In various embodiments, a slot may comprise a shape configured to aid in securing hook 430 to an article of wear. A slot may lie on a surface. The surface may comprise a planar surface (e.g., a plane). The surface may be perpendicular to a first direction in which second magnetic material 420 is configured to couple to first magnetic material 320. A slot may comprise a nonlinear shape. The non-linear shape may be provided in a plane though which the slot is configured to receive a portion of an article of wear. The nonlinear shape may be provided along a longest dimension of the slot through which the portion of the article of wear may be received into the slot. The nonlinear shape may define an asymmetrical opening through which the portion of the article of wear may be received in the slot. A nonlinear shape may comprise at least one curved (e.g., nonlinear) portion. A curved portion may comprise a bend or an arc. A nonlinear shape may comprise at least two noncolinear linear portions. A linear portion may comprise a straight line. A corner (e.g., vertex) may join two noncolinear linear portions. A corner may join a linear portion and a nonlinear portion. An angle may be formed between two noncolinear linear portions. A slot may comprise at least one of a curve (e.g., bend, arc, etc.) and a corner (e.g., vertex, etc.). A curve may comprise a continuous change in direction. A corner may comprise a discrete change in direction. The one or more changes in direction may be configured to aid in retaining hook 430 to an article of wear.

In various embodiments, a portion of slot 440 proximate closed end 442 may be oriented in a direction (e.g., a second direction) different from another direction (e.g., a third direction) of another portion of slot 440 proximate opening 444, such that a portion of an article of wear may be received within slot 440 in each of at least two different directions. Each direction of multiple portions of slot (e.g., a first portion proximate closed end 442, a second portion proximate opening 444, a third portion interconnecting the first portion and the second portion, etc.) may be oriented in different relative direction. Slot 440 may comprise at least two open portions oriented at different respective dimensions, thereby increase a number of directions in which front plate 41 is required to be moved about a portion of an article of wear in order to be secured to or removed from the article of wear. Each different relative direction may be perpendicular a first direction in which second magnetic material 420 is configured to couple to first magnetic material 320.

In various embodiments, a nonlinear shape of slot 440 may require a user to manipulate hook 430 about a portion of an article of wear until closed end 442 rests on a portion of the article of wear. For example, slot 440 may comprise a first corner 446-1 and a second corner 446-2. When coupling front plate 41 to a button of an article of wear, hook 430 may be manipulated such that the threads fastening the button to the article of wear are passed through opening 444 of slot 440, around first corner 446-1, and around second corner 446-2, until contacting closed end 442 of slot 440. A force of gravity may secure first hook 430 in this position (e.g., as shown in FIG. 1) until an opposing force is applied to lift hook 430 such that closed end 442 no longer contacts the portion of the article of wear. Subsequently, hook 430 may be manipulated to remove front plate 41 from the article of wear.

In various embodiments, front plate 41 may comprise one or more retainers adjacent slot 440 that are each configured to engage a portion of an article of wear to minimize a risk of hook 430 from unintentionally decoupling from the article of wear. For example, front plate 41 may comprise a first retainer, such as first retainer 456-1, and a second retainer, such as second retainer 456-2. First retainer 456-1 may be disposed on a first side of slot 440, and second retainer 456-2 may be disposed on a second side of slot 440 that is opposite the first side. First retainer 456-1 and second retainer 456-2 may each protrude above outer hook surface 450. First retainer 456-1 and second retainer 456-2 may each comprise an arcuate shape. The arcuate shape may be similar to a shape of a button, such as button 7. First retainer 456-1 and second retainer 456-2 may each be disposed proximate first end 442 of slot 440. First retainer 456-1 and second retainer 456-2 may each be configured to retain hook 430 relative to an article of wear. First retainer 456-1 and/or second retainer 456-2 may be configured to obstruct a portion of an article of wear (e.g., button 7). For example, when hook 430 is coupled to a button of an article of wear, first retainer 456-1 and/or second retainer 456-2 may provide a retaining force that retains hook 430 to the button. With sufficient applied force, hook 430 may overcome the retaining force, thereby enabling hook 430 to decouple from the article of wear. When hook 430 is being coupled to a button of an article of wear, a force may be applied to move the button past first retainer 456-1 and/or second retainer 456-2.

In various embodiments, hook 430 may comprise one or more lips, such as first hook lip (e.g., first lip, etc.) 452-1 and second hook lip (e.g., second lip) 452-2. First hook lip 452-1 and second hook lip 452-2 may each extend along a portion of a perimeter of hook 430. First hook lip 452-1 and second hook lip 452-2 may each protrude above outer hook surface 450. First hook lip 452-1 may extend along at least a portion of third hook end 436. Second hook lip 452-2 may extend along at least a portion of forth hook end 438. First hook lip 452-1 may extend along all of third hook end 432. A thickness of first lip 452-1 and second lip 452-2 may prevent hook 430 from engaging a button of an article of wear. However, first hook lip 452-1 and second hook lip 452-2 may each terminate proximate opening 444 to enable slot 440 to receive a button of an article of wear.

Figure 5:
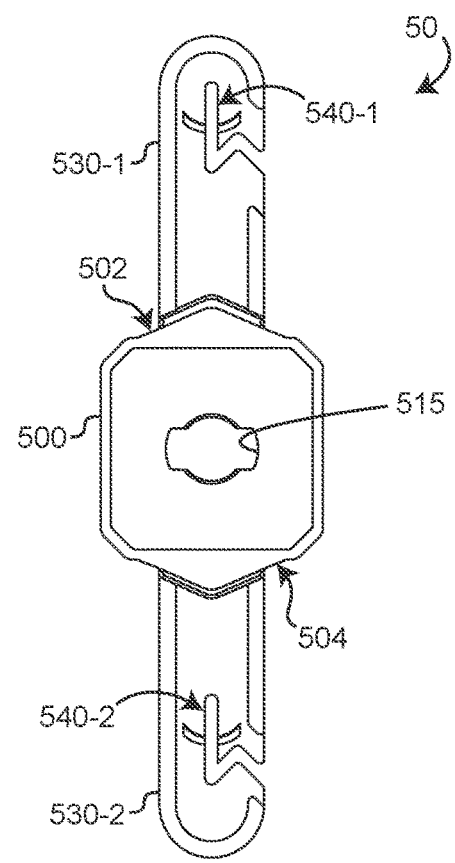
FIG. 5 is a front view showing another implementation of a front plate, according to one or more aspects described herein.

FIG. 5 shows a front view of a front plate 50, which may be similar to, or share similar aspect or components with the front plates discussed previously herein (e.g., front plate 40, front plate 41, etc.). It should be understood by one skilled in the art that FIG. 5 is an example illustration of front plate 50, and one or more components of front plate 50 may be located in any suitable position within, or external to, front plate 50. Front plate 50 may be a unitary part formed using any number of methods, such as casting, forging, molding, stamping, forming, and machining. Front plate 50 may be formed of multiple components that are assembled together (e.g., two components, three components, four components, etc.). Front plate 50 may comprise a center portion, such as center portion 500, configured to receive an accessory (e.g., camera 3, etc.) and one or more hooks, such as first hook (e.g., tab, etc.) 530-1 and second hook 530-2, each configured to releasably couple with a respective portion of an article of wear (e.g., button 7, threads 9, etc.). The one or more hooks may include two hooks configured to extend symmetrically from center portion 500 of plate 50 about a dimension (e.g., a width) of center portion 500.

In various embodiments, center portion 500 may comprise a rigid material as discussed previously herein. Center portion 500 may comprise a mount interface, such as mount interface 515, configured to receive an accessory. Center portion 500 may extend from a first end (e.g., first center portion end, etc.) 502 to a second end (e.g., second center portion end, etc.) 504. First hook 530-1 may extend from first end 502. Second hook 530-1 may extend from second end 504. First hook 530-1 may oppose (e.g., project in a different direction relative to) second hook 530-2. Each hook 530-1/530-2 may comprise a respective slot. For example, first hook 530-1 may comprise a first slot 540-1 and second hook 530-2 may comprise a second slot 540-2. Each slot 540-1/540-2 may be configured to receive a respective portion of an article of wear, such as a button and/or threads that fasten the button to the article of wear. Each slot may comprise a respective slot opening. The respective slot openings may be located on a same side of front plate 51, or the respective slot openings may be located on opposite sides of front plate 51.

Employing more than one hook may further increase a retention force between a front plate and an article of wear. Employing two hooks may double a retention force between a front plate and an article of wear. Employing two hooks may provide redundancy in an event that one of the portions of the article of wear to which one of the hooks is coupled fails. Employing two hooks as opposed to one may reduce stress imparted on the respective portions of the article of wear with which each hook is configured to couple.

Aspects of this disclosure may relate to a coupler for that enables mounting of an accessory relative to an article of wear. A first example embodiment of a coupler may comprise a back plate comprising a first magnetic material and a front plate comprising a mount interface configured to couple to a provided accessory device, a slot extending between an open end and a closed end, and a second magnetic material. The first magnetic material of the back plate may be configured to cooperate with the second magnetic material of the front plate in a first direction to releasably secure the front plate to the back plate, and the slot may be configured to receive a portion of a provided article of wear in a second direction to couple the front plate to the provided article of wear, where the second direction is perpendicular to the first direction.

A second example embodiment may include a coupler comprising a back plate that includes a first magnetic material and a front plate that is separable from the back plate. The front plate may comprise a center portion comprising a mount interface, a hook extending from the center portion, the hook including a slot lying on a plane and extending between an open end and a closed end, the slot configured to receive a portion of a provided article of wear to couple the front plate to the provided article of wear, and a second magnetic material. One of the first magnetic material of the back plate and the second magnetic material of the front plate may be configured to attract the other of the first magnetic material of the back plate and the second magnetic material of the front plate in a direction that is perpendicular to the plane to couple the back plate to the front plate.

A third example embodiment may include a coupler comprising a first part and a second part that is separate from the first part, where the first part comprises a mount interface and a slot, the mount interface configured to receive a provided accessory, the slot configured to receive a portion of a provided article of wear to couple the first part to the provided article of wear, and where the second part magnetically couples the first part to the second part over the provided article of wear to secure the coupler to the provided article of wear.

A fourth example embodiment may include a coupler as in any of the preceding example embodiments where at least one of the first magnetic material and the second magnetic material comprises a permanent magnet that is magnetized in the first direction.

A fifth example embodiment may include a coupler as in any of the preceding example embodiments where the open end of the slot is disposed proximal to the mount interface, and wherein the closed end of the slot is disposed distal to the mount interface.

A sixth example embodiment may include a coupler as in any of the preceding example embodiments where the slot is offset from the mount interface.

A seventh example embodiment may include a coupler as in any of the preceding example embodiments further comprising a first protrusion that is disposed adjacent a first side of the slot, a second protrusion that is disposed adjacent a second side of the slot, where each of the first protrusion and the second protrusion comprise an arcuate shape.

An eighth example embodiment may include a coupler as in any of the preceding example embodiments where the back plate comprises a lip, and engagement of the back plate with the front plate causes the lip to encircle at least a portion of a periphery of the front plate.

A ninth example embodiment may include a coupler as in any of the preceding example embodiments where the back plate comprises one of a track and a channel, the front plate comprises the other of the track and the channel, and the track is configured to cooperate with the channel to increase a sheer retention force between the back plate and the front plate.

A tenth example embodiment may include a coupler as in any of the preceding example embodiments where the slot comprises a nonlinear shape.

An eleventh example embodiment may include a coupler as in any of the preceding example embodiments where at least one of the first magnetic material and the second magnetic material comprises a permanent magnet that includes a north pole and a south pole; and the north pole and the south pole of the permanent magnet are each oriented parallel to the slot.

A twelfth example embodiment may include a coupler as in any of the preceding example embodiments where the open end of the slot is disposed a first distance from the center portion, the closed end of the slot is disposed a second distance from the center portion, and the first distance is less than the second distance.

A thirteenth example embodiment may include a coupler as in any of the preceding example embodiments where the center portion comprises a first width, the hook comprises a second width parallel to the first width, and the first width is greater than the second width.

A fourteenth example embodiment may include a coupler as in any of the preceding example embodiments where the center portion comprises a first length, the hook comprises a second length parallel to the first length, and the first length is greater than or equal to the second length.

A fifteenth example embodiment may include a coupler as in any of the preceding example embodiments where the hook comprises a first lip and a second lip, and each of the first lip and the second lip terminate proximate the open end of the slot to enable the slot to receive the portion of the provided article of wear.

A sixteenth example embodiment may include a coupler as in any of the preceding example embodiments where the slot comprises at least one nonlinear portion or at least two noncolinear linear portions.

A seventeenth example embodiment may include a coupler as in any of the preceding example embodiments where the slot comprises at least one of a curved portion and a corner.

An eighteenth example embodiment may include a coupler as in any of the preceding example embodiments where the second part magnetically couples to the first part in a first direction and wherein the slot is configured to receive the portion of the provided article of wear in a second direction that is perpendicular to the first direction.

A nineteenth example embodiment may include a coupler as in any of the preceding example embodiments where the second part magnetically couples to the first part in a first direction, the slot lies on a plane and extends between an open end and a closed end, and wherein the first direction is perpendicular to the plane.

A twentieth example embodiment may include a coupler as in any of the preceding example embodiments where the open end of the slot is disposed a first distance from the mount interface, the closed end of the slot is disposed a second distance from the mount interface, and wherein the first distance is less than the second distance.

A twenty-first example embodiment may include a coupling system, comprising a portable recording device comprising a second mounting interface, and a coupler of any one of the example embodiments recited above, where the second mounting interface of the portable recording device is configured to releasably engage the mounting interface of the coupler.

In some embodiments, elements of a coupler may be disposed on different plates relative to embodiments illustrated in FIG. 1-5. For example, each of a back plate and a front plate may comprise a respective hook. These hooks may enable each of the back plate and the front plate to engage a same portion (e.g., thread) of an article of wear on opposite sides of a layer of the article of wear. For example, two hooks may enable the coupling system to engage a thread of a button on opposite sides of a button hole in a layer of an article of wear to which the button is attached via the thread. Alternately, the back plate may comprise a hook instead of front plate. The front plate may lack (e.g., exclude, not comprise, etc.) a hook in such embodiments. Accordingly, the coupler may remain coupled to a same article of wear via two different mechanisms (e.g., slot, magnetic materials) in two different directions, though a hook comprising a slot may be disposed on a different element of the coupling system and engage the article of wear on a different side of a layer of the article of wear. For example, this alternate embodiment may enable a hook of a back plate to engage a thread adjacent to an interior surface adjacent a button hole in a layer of article of wear 5 and/or between layers of article of wear 5, rather than engaging the thread adjacent an exterior surface of an outer layer of the article of wear 5 as illustrated in FIG. 1-2.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A coupler comprising:
a back plate comprising a first magnetic material; and
a front plate comprising:
   a mount interface configured to couple to a provided accessory device;
   a slot extending between an open end and a closed end; and
   a second magnetic material; wherein:
      the first magnetic material of the back plate is configured to cooperate with the second magnetic material of the front plate in a first direction to releasably secure the front plate to the back plate; and
      the slot is configured to receive a portion of a provided article of wear in a second direction to couple the front plate to the provided article of wear, wherein the second direction is perpendicular to the first direction, wherein the open end of the slot is disposed proximal to the mount interface, and wherein the closed end of the slot is disposed distal to the mount interface.

2. The coupler of claim 1 wherein at least one of the first magnetic material and the second magnetic material comprises a permanent magnet that is magnetized in the first direction.

3. The coupler of claim 1 wherein the slot is offset from the mount interface.

4. The coupler of claim 1 further comprising a first protrusion that is disposed adjacent a first side of the slot, a second protrusion that is disposed adjacent a second side of the slot, wherein each of the first protrusion and the second protrusion comprise an arcuate shape.

5. The coupler of claim 1 wherein the back plate comprises a lip, and engagement of the back plate with the front plate causes the lip to encircle at least a portion of a periphery of the front plate.

6. The coupler of claim 1 wherein:
the back plate comprises one of a track and a channel;
the front plate comprises the other of the track and the channel; and
the track is configured to cooperate with the channel to increase a sheer retention force between the back plate and the front plate.

7. The coupler of claim 1 wherein the slot comprises a nonlinear shape.

8. A coupler comprising:
a back plate comprising a first magnetic material; and
a front plate that is separable from the back plate, the front plate comprising:
   a center portion comprising a mount interface;
   a hook extending from the center portion, the hook including a slot lying on a plane and extending between an open end and a closed end, the slot configured to receive a portion of a provided article of wear to couple the front plate to the provided article of wear; and
   a second magnetic material; wherein:
      one of the first magnetic material of the back plate and the second magnetic material of the front plate is configured to attract the other of the first magnetic material of the back plate and the second magnetic material of the front plate in a direction that is perpendicular to the plane to couple the back plate to the front plate;
      the open end of the slot is disposed a first distance from the center portion;
      the closed end of the slot is disposed a second distance from the center portion; and
      the first distance is less than the second distance.

9. The coupler of claim 8 wherein:
at least one of the first magnetic material and the second magnetic material comprises a permanent magnet that includes a north pole and a south pole; and
the north pole and the south pole of the permanent magnet are each oriented parallel to the slot.

10. The coupler of claim 8 wherein:
the center portion comprises a first width;
the hook comprises a second width parallel to the first width; and
the first width is greater than the second width.

11. The coupler of claim 8 wherein:
the center portion comprises a first length;
the hook comprises a second length parallel to the first length; and
the first length is greater than or equal to the second length.

12. The coupler of claim 8 wherein:
the hook comprises a first lip and a second lip; and
each of the first lip and the second lip terminate proximate the open end of the slot to enable the slot to receive the portion of the provided article of wear.

13. The coupler of claim 8 wherein the slot comprises at least one nonlinear portion or at least two noncolinear linear portions.

14. A coupling system, comprising:
a portable recording device comprising a second mounting interface; and
a coupler comprising:
   a first part and a second part that is separate from the first part, wherein:
      the first part comprises a mount interface, a hook, a center portion, and a slot
      the center portion comprises the mount interface;
      the mount interface is configured to receive the second mounting interface;
      the hook extends from an end of the center portion;
      the hook extends from a first hook end to a second hook end between a third hook end and a fourth hook end;
      the second hook end is opposite the first hook end;
      the third hook end is opposite the fourth hook end;
      the second hook end is adjacent the end of the center portion;
      the slot is configured to receive a portion of a provided article of wear to couple the first part to the provided article of wear;
      the slot comprises an opening disposed at the fourth hook end; and
      the second part magnetically couples the first part to the second part over the provided article of wear to secure the coupler to the provided article of wear.

15. The coupling system of claim 14 wherein the slot comprises at least one of a curved portion and a corner.

16. The coupling system of claim 14 wherein the second part magnetically couples to the first part in a first direction and wherein the slot is configured to receive the portion of the provided article of wear in a second direction that is perpendicular to the first direction.

17. The coupling system of claim 14 wherein the second part magnetically couples to the first part in a first direction, the slot lies on a plane and extends between an open end and a closed end, and wherein the first direction is perpendicular to the plane.

18. The coupling system of claim 17 wherein the open end of the slot is disposed a first distance from the mount interface, the closed end of the slot is disposed a second distance from the mount interface, and wherein the first distance is less than the second distance.

19. The coupling system of claim 14 wherein:
the center portion comprises a first width;
the hook comprises a second width parallel to the first width;
the second width is disposed between the third hook end and the fourth hook end; and
the first width is greater than the second width.

20. The coupling system of claim 14, wherein the slot comprises a nonlinear shape, the non-linear shape comprising three noncolinear linear portions.

* * * * *